(12) United States Patent
Braunheim et al.

(10) Patent No.: US 10,876,507 B2
(45) Date of Patent: *Dec. 29, 2020

(54) FILTER DEVICE

(71) Applicant: Mahle International GmbH, Stuttgart (DE)

(72) Inventors: Michael Braunheim, Goeppingen (DE); Torsten Lika, Stuttgart (DE)

(73) Assignee: Mahle International GmbH

( * ) Notice: Subject to any disclaimer, the term of this patent is extended or adjusted under 35 U.S.C. 154(b) by 0 days.

This patent is subject to a terminal disclaimer.

(21) Appl. No.: 16/032,538

(22) Filed: Jul. 11, 2018

(65) Prior Publication Data

US 2019/0001245 A1    Jan. 3, 2019

Related U.S. Application Data

(63) Continuation of application No. 15/135,203, filed on Apr. 21, 2016, now Pat. No. 10,279,289, which is a
(Continued)

(30) Foreign Application Priority Data

Sep. 15, 2009 (DE) .................. 10 2009 041 523

(51) Int. Cl.
*B01D 35/30* (2006.01)
*F02M 37/42* (2019.01)
(Continued)

(52) U.S. Cl.
CPC ............. *F02M 37/42* (2019.01); *B01D 29/11* (2013.01); *B01D 35/005* (2013.01);
(Continued)

(58) Field of Classification Search
CPC ...... B01D 35/30; B01D 36/003; B01D 35/16; B01D 36/006; B01D 35/153; B01D 29/11;
(Continued)

(56) References Cited

U.S. PATENT DOCUMENTS 3,312,350 A    4/1967   Kasten
3,465,883 A    9/1969   Jumper
(Continued)

FOREIGN PATENT DOCUMENTS

DE    3903675 A1    8/1990
DE    3941996 A1    6/1991
(Continued)

OTHER PUBLICATIONS

English Abstract for DE 3903675 A1.
(Continued)

*Primary Examiner* — Thomas M Lithgow
(74) *Attorney, Agent, or Firm* — Fishman Stewart PLLC

(57) ABSTRACT

A filter device may include a ring filter element arranged in a filter housing in an upright manner. The ring filter element may have an upper end disc, a lower end disc, a filter material arranged therebetween, and a dirt pot provided on the lower end disc. The dirt pot may be provided on the lower end disc, a protruding pin, and an opening on a base side of the dirt pot. The filter device may include a functional element having a channel configured to receive the protruding pin. A portion of the functional element may be configured to penetrate the opening of the dirt pot such that the ring filter element is sealed at the opening. The portion of the functional element may have at least one water discharge opening. The filter device may be operational when the pin engages into the channel.

26 Claims, 3 Drawing Sheets

Related U.S. Application Data continuation of application No. 13/496,250, filed as application No. PCT/EP2010/062585 on Aug. 27, 2010, now Pat. No. 9,333,448.

(51) Int. Cl.

| | | |
|---|---|---|
| *B01D 36/00* | (2006.01) | |
| *F02M 37/24* | (2019.01) | |
| *B01D 35/16* | (2006.01) | |
| *B01D 35/153* | (2006.01) | |
| *B01D 29/11* | (2006.01) | |
| *B01D 35/00* | (2006.01) | |
| B01D 27/00 | (2006.01) | |
| B01D 27/08 | (2006.01) | |
| B01D 17/04 | (2006.01) | |
| F01M 11/03 | (2006.01) | |

(52) U.S. Cl.
CPC .......... *B01D 35/153* (2013.01); *B01D 35/16* (2013.01); *B01D 35/30* (2013.01); *B01D 36/003* (2013.01); *B01D 36/006* (2013.01); *F02M 37/24* (2019.01); B01D 17/045 (2013.01); B01D 27/00 (2013.01); B01D 27/08 (2013.01); B01D 2201/291 (2013.01); B01D 2201/295 (2013.01); B01D 2201/305 (2013.01); B01D 2201/4007 (2013.01); B01D 2201/4053 (2013.01); B01D 2201/4084 (2013.01); F01M 11/03 (2013.01)

(58) Field of Classification Search
CPC ...... B01D 35/005; B01D 27/00; B01D 27/08; B01D 2201/4053; B01D 17/045; B01D 2201/291; B01D 2201/305; B01D 2210/4007; B01D 2201/4084; B01D 2201/295; F01M 11/03; F02M 37/24
USPC .................................. 210/249, 248
See application file for complete search history.

(56) References Cited

U.S. PATENT DOCUMENTS

| | | | |
|---|---|---|---|
| 3,502,218 A | | 3/1970 | Tuffnell et al. |
| 4,497,714 A | | 2/1985 | Harris |
| 4,502,955 A | | 3/1985 | Schaupp |
| 4,619,764 A | | 10/1986 | Church et al. |
| 5,089,129 A | | 2/1992 | Brigman |
| 5,548,893 A | | 8/1996 | Koelfgen |
| 5,814,215 A | | 9/1998 | Bruss et al. |
| 6,139,738 A | | 10/2000 | Maxwell |
| 6,409,804 B1 | | 6/2002 | Cook et al. |
| 6,706,181 B1 | | 3/2004 | Baumann et al. |
| 6,835,305 B1 | | 12/2004 | Baumann et al. |
| 6,936,169 B2 | | 8/2005 | Baumann et al. |
| 7,237,681 B2 | | 7/2007 | Brieden et al. |
| 7,527,739 B2 | | 5/2009 | Jiang et al. |
| 8,673,138 B2 | | 3/2014 | Braunheim |
| 9,108,125 B2 | | 8/2015 | Braunheim |
| 9,205,355 B2 | | 12/2015 | Deschamps et al. |
| 9,333,448 B2 | * | 5/2016 | Braunheim .......... B01D 35/153 |
| 9,810,373 B2 | | 11/2017 | Braunheim |
| 10,035,090 B2 | | 7/2018 | Kollmann et al. |
| 10,279,289 B2 | * | 5/2019 | Braunheim .......... B01D 35/153 |
| 2005/0274664 A1 | | 12/2005 | Stoehr et al. |
| 2007/0084776 A1 | | 4/2007 | Sasur |
| 2007/0240390 A1 | | 10/2007 | Becker et al. |
| 2008/0024719 A1 | | 1/2008 | Kamishita et al. |
| 2009/0008321 A1 | | 1/2009 | Tanner et al. |
| 2011/0017649 A1 | | 1/2011 | Sasur |
| 2011/0089091 A1 | | 4/2011 | Grass et al. |

FOREIGN PATENT DOCUMENTS

| | | |
|---|---|---|
| DE | 3903675 A1 | 8/1999 |
| DE | 199 51 085 A1 | 4/2001 |
| DE | 19951085 A1 | 4/2001 |
| DE | 29921543 U1 | 4/2001 |
| DE | 10308427 A1 | 9/2004 |
| DE | 102005000658 A1 | 7/2006 |
| DE | 102005015194 A1 | 10/2006 |
| DE | 202006006084 U1 | 8/2007 |
| DE | 202006017305 U1 | 3/2008 |
| DE | 102007048550 A1 | 4/2008 |
| DE | 102007009352 A1 | 8/2008 |
| EP | 0260069 A2 | 3/1988 |
| EP | 0385113 A2 | 9/1990 |
| EP | 0405447 A2 | 1/1991 |
| EP | 1233173 A2 | 8/2002 |
| EP | 1695753 A1 | 8/2006 |
| JP | 7217577 A | 8/1995 |
| JP | H07217577 A | 8/1995 |
| WO | 2006105755 A1 | 10/2006 |
| WO | 2009080455 A1 | 7/2009 |

OTHER PUBLICATIONS

English Translation of DE 10 2005 000 658 A1, Feb. 19, 2020.
English Abstract of DE 103 08 427 A1, Feb. 19, 2020.
English Abstract of DE 10 2007 039679 A1 equivalent application to DE 20 2006 017 305 A1, Feb. 19, 2020.
English Abstract for DE 39 41 996 A1 of equivalent application EP 0433664, Feb. 19, 2020.
English Abstract of DE 10 2007 009 352 A1, Feb. 19, 2020.
English Abstract of DE 199 51 085 A1, Feb. 19, 2020.
English Abstract DE 10 2005 015 194 A1, Feb. 19, 2020.
English Abstract JPH07217577, Feb. 19, 2020.
International Search Report PCT/EP2010/062585, dated Dec. 6, 2010.
English abstract for EP-0385113, Feb. 19, 2020.
Search Report for EP-10751600.7, dated Jun. 14, 2013.
English abstract for EP-1233173, Feb. 19, 2020.
English abstract for DE-102007048550, Feb. 19, 2020.
English Trans. DE 3903675, Feb. 19, 2020.
English Abstract of EP 1695753, Feb. 19, 2020.

* cited by examiner

FILTER DEVICE

CROSS-REFERENCE TO RELATED APPLICATIONS

This application is a Continuation of U.S. patent application Ser. No. 15/135,203, filed Apr. 21, 2016, which is a Continuation of U.S. patent application Ser. No. 13/496,250, filed May 30, 2012 and issued as U.S. Pat. No. 9,333,448 on May 10, 2016, which is a National Stage of International Application No. PCT/EP2010/062585 filed Aug. 27, 2010, which claims priority to German Patent Application No. 10 2009 041 523.8 filed Sep. 15, 2009, all of which are hereby incorporated by reference in their entirety.

TECHNICAL FIELD

The present invention relates to a filter device having a ring filter element arranged in a filter housing in an upright manner, which ring filter element has an upper and a lower end disc. The invention further relates to a ring filter element for such a filter device.

BACKGROUND

A generic filter device is sufficiently known and is to be found in almost all modern motor vehicles, used for example as an oil- or fuel filter.

In order to be able to guarantee a problem-free filter effect, it is often important for the manufacturers of such filter devices that only filter elements which have been authorized or produced by them are used. With the use of filter elements of external brands or imitations, namely not only can be filter performance be impaired, but at the same time also damage can be caused. On the other hand, it is desirable to be able to produce and offer filter elements for such filter devices at as favourable a cost as possible.

The present invention is therefore concerned with the problem of providing for a filter device of the generic type an improved or at least an alternative embodiment, which in particular enables exclusively the use of authorized filter elements.

This problem is solved according to the invention by the subjects of the independent claims. Advantageous embodiments are the subject of the dependent claims.

SUMMARY

The present invention is based on the general idea of providing a ring filter element, known per se, which is arranged in an upright manner in a filter housing of a filter device, with a dirt pot on the base side, on which a protruding, nozzle-shaped pin is constructed, by which the ring filter element engages into a channel provided on a filter housing pot or on a functional element, in so far as the ring filter element is correctly mounted. The dirt pot is arranged here on the lower end disc of the ring filter element, wherein the socked-shaped pin is constructed in one piece with the dirt pot, and an operation of the filter device is then enabled exclusively in so far as the pin of the dirt pot engages into the channel on the filter housing pot side or respectively on the functional element side. The dirt pot and hence also the socked-shaped pin are preferably constructed here in one piece or in one part with a lower end disc of the ring filter element, in particular the dirt pot is welded onto the lower end disc of the ring filter element, for example by means of friction welding, ultrasonic welding or laser welding. A water separator is provided in addition inside the dirt pot, so that the dirt pot per se can be used both as a dirt-collecting chamber and also as a water-collecting chamber, and has on the base side at least one outlet for collected dirt or respectively for collected water. With the filter device according to the invention it is therefore possible that it can only be used in so far as ring filter elements which fit it are used with the pin on the dirt pot side; the use of other ring filter elements by which under certain circumstances the filter performance of the filter device could be impaired, can therefore be reliably prevented.

In an advantageous further development of the solution according to the invention, the water separator which is arranged inside the dirt pot is constructed as a coalescer and at the same time is welded onto the lower end disc of the ring filter element. Such a coalescer is able to collect and divert water particles and therefore for example to filter out water components present in the fuel, so that these can not arrive into the combustion engine and cause corrosion damage there. In this case, the filter device can be constructed for example as an oil- or fuel filter, wherein quite generally a construction as an air filter is also conceivable. The water separator is connected here to the lower end disc of the ring filter element, in particular is welded on, and can thereby be exactly positioned and fixed before the assembly or respectively before the closing of the dirt pot, which distinctly simplifies the manufacturing process of the filter device according to the invention.

In a further advantageous embodiment of the solution according to the invention, a guide is provided on the filter housing pot or on a functional element arranged therein, along which guide the pin of the dirt pot is guided on mounting of the ring filter element to the channel. Such a guide can be constructed for example in the manner of an incline, which enables an arbitrary insertion of the ring filter element, so that the latter slides by means of the pin along the guide into the channel and thereby a correct mounting can always be guaranteed. Such a guide can be realized on the one hand at a favourable cost, for example by a suitable injection mould, and on the other hand guarantees a distinctly simplified handling of the filter device according to the invention, because the ring filter element can be inserted into the filter housing pot in an arbitrary rotation angle position and can be transferred by a simple twisting into its proper and correct position. An incorrect mounting of the ring filter element can be thereby reliably ruled out.

Further important features and advantages of the invention will emerge from the subclaims, from the drawings and from the associated description of the figures with the aid of the drawings.

It shall be understood that the features mentioned above and to be explained in further detail below are able to be used not only in the respectively indicated combination, but also in other combinations or in isolation, without departing from the scope of the present invention.

Preferred example embodiments of the invention are illustrated in the drawings and are explained in further detail in the following description, wherein identical reference numbers refer to identical or similar or functionally identical components.

BRIEF DESCRIPTION OF THE DRAWINGS

There are shown, respectively diagrammatically.

DETAILED DESCRIPTION

Figure 1:
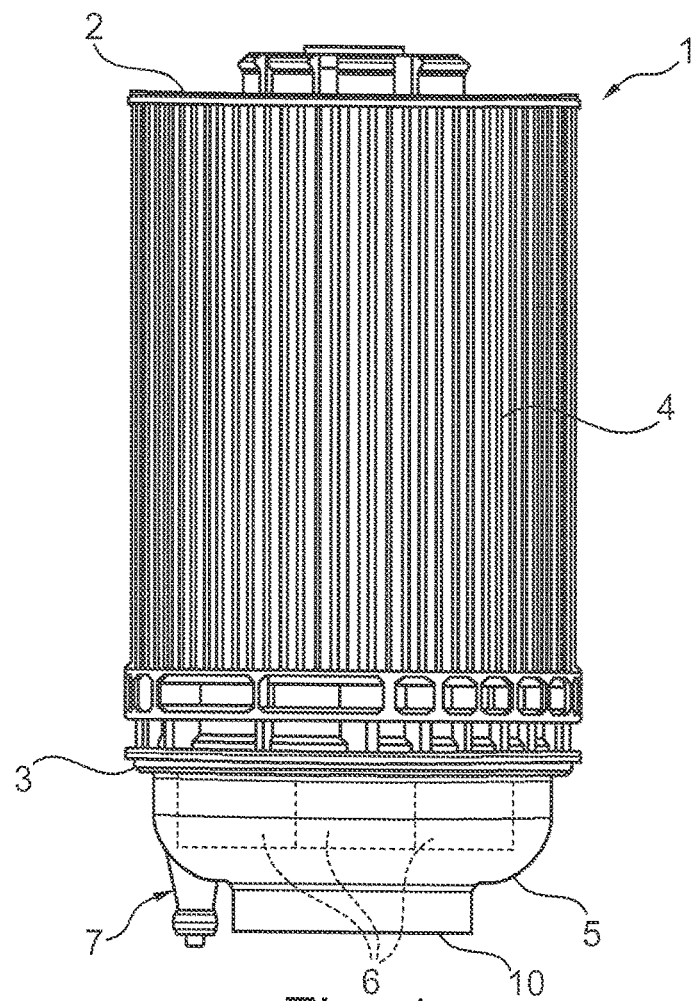
FIG. 1 a ring filter element according to the invention, in a side view.
Figure 2:
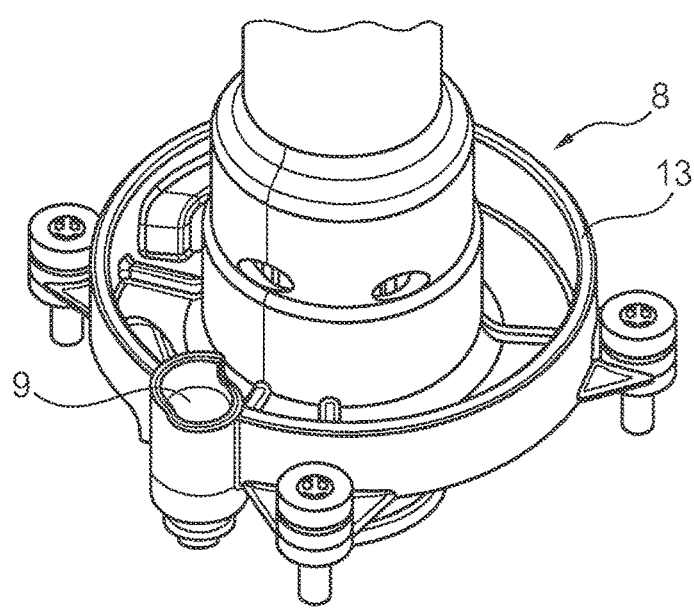
FIG. 2 a view onto a functional element.
Figure 3:
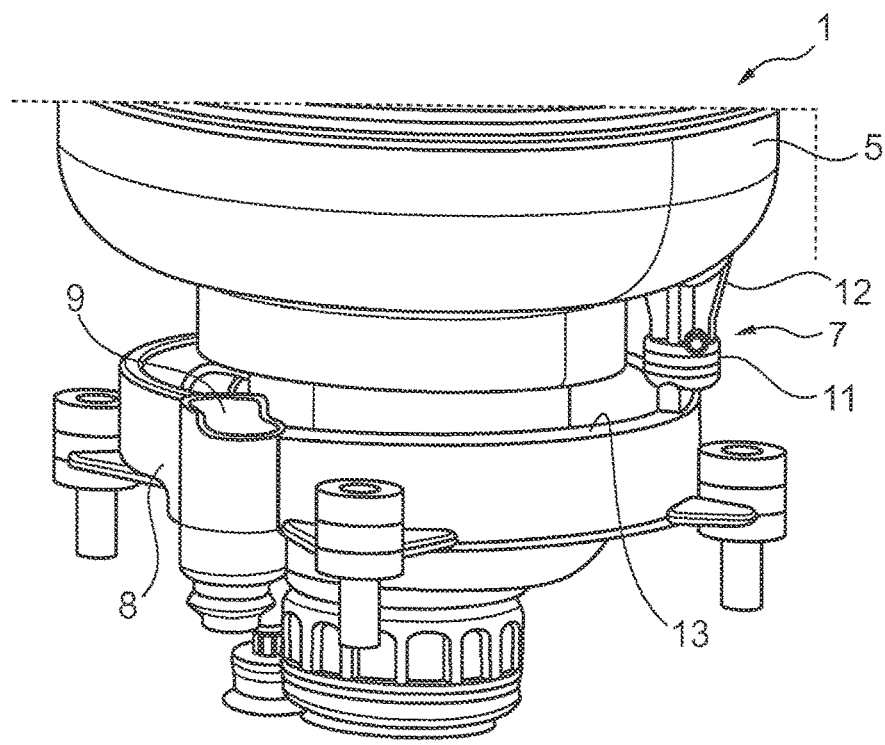
FIG. 3 a cooperation of the ring filter element with the functional element.
Figure 4:
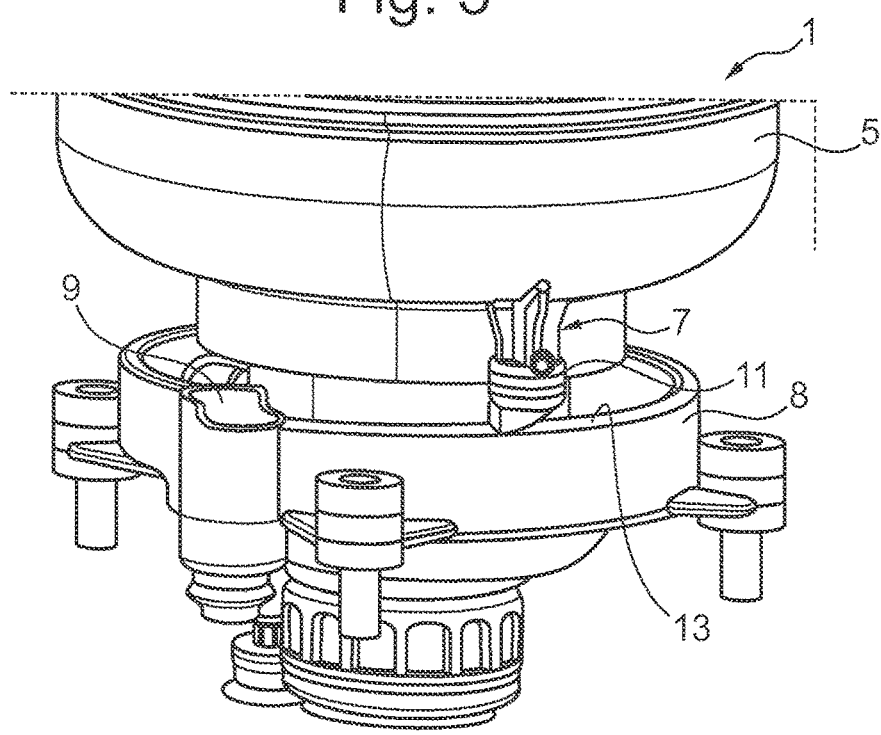
FIG. 4 an illustration as in FIG. 3, but with a different rotation angle position of the ring filter element, FIG. 5 a detail illustration of a pin, projecting in a nozzle shape, of the ring filter element before immersion into an associated channel, FIG. 6 an illustration as in FIG. 5, but after the immersion of the pin into the channel.
Figure 5:
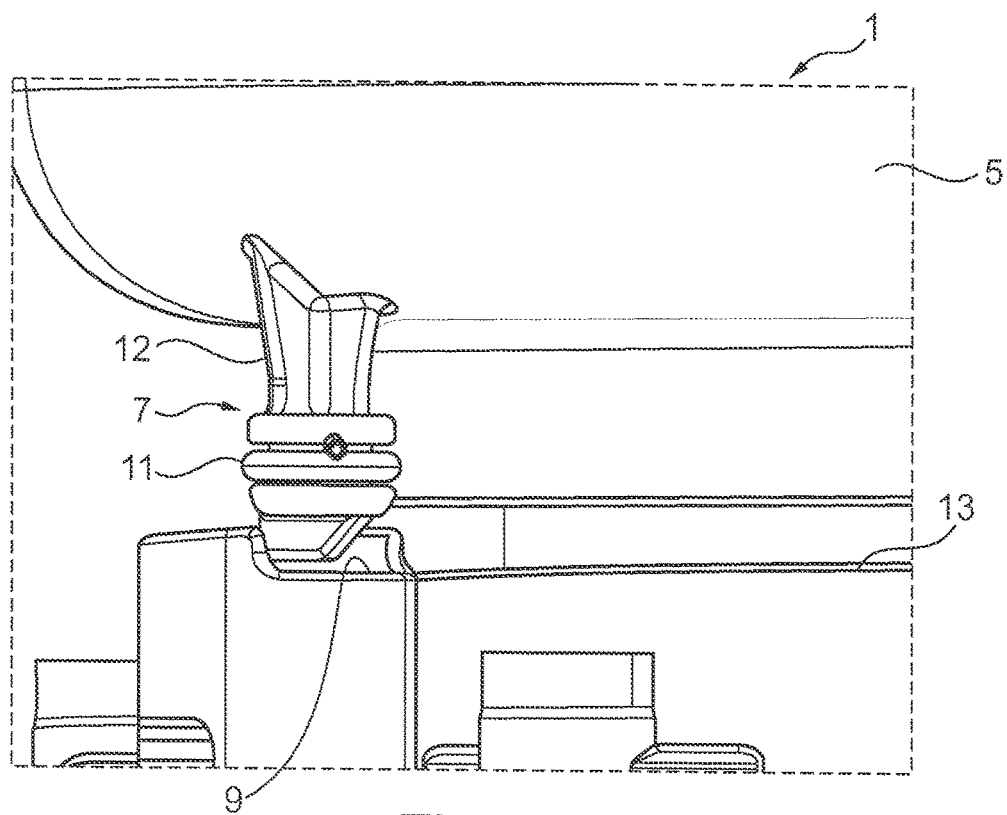
Figure 6:
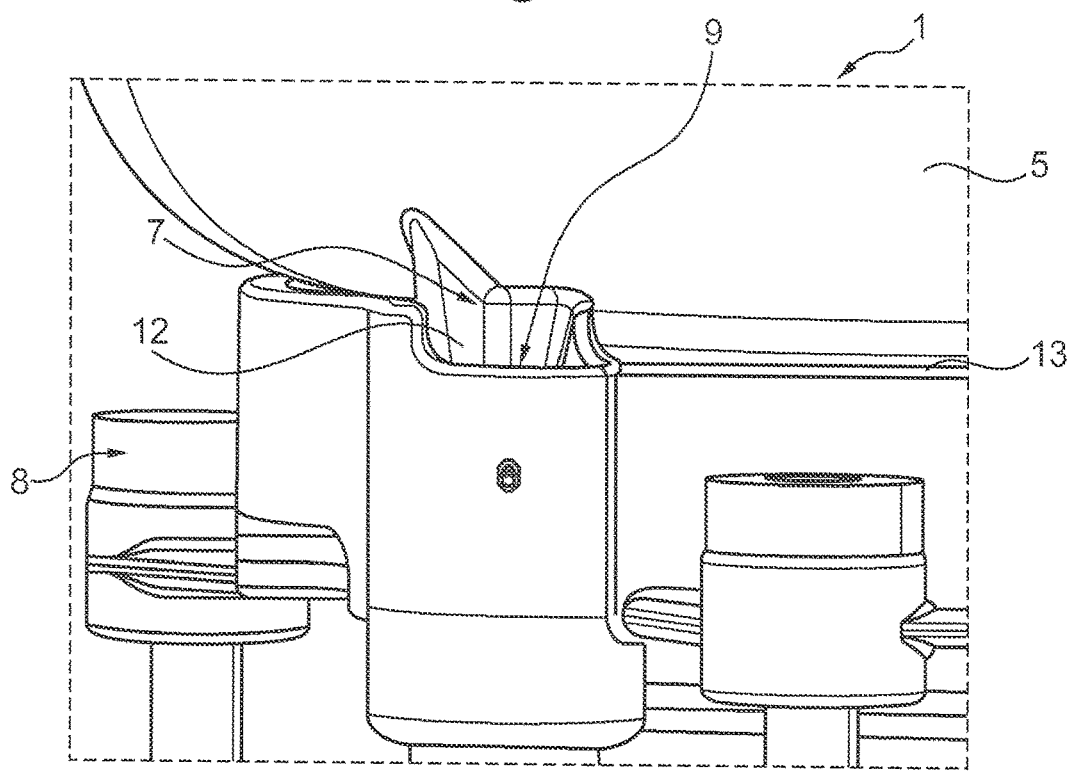

In accordance with FIG. 1, a ring filter element 1 according to the invention has an upper end disc 2 and a lower end disc 3. Between the two end discs 2 and 3 a filter material 4 is arranged, for example in the manner of a pleated star. The ring filter element 1 is arranged here in a similar manner to the illustration in FIG. 1 in an upright manner in a filter housing, not shown, of a filter device, for example an oil- or fuel filter. According to the invention, on the lower end disc 3 a dirt pot 5 is now provided, having a water separator 6 arranged therein and only sketched by a dashed line. A nozzle-shaped pin 7 is provided protruding downward on the dirt pot 5, which pin is constructed in a complementary manner to a channel 9 constructed on the filter housing pot, which is not shown, or on a functional element 8 (cf. FIG. 2) which is able to be inserted into this filter housing pot which is not shown. An operation of the complete filter device is then possible here exclusively in so far as the pin 7 engages into the channel 9, which can be constructed in particular as an idle channel.

Generally, the water separator 6 can be constructed as a so-called coalescer and can be welded to the lower end disc 3 of the ring filter element 1. The welding can take place for example by means of ultrasonic welding, friction welding or laser welding and guarantees a reliable positioning and fixing of the water separator 6 on the lower end disc 3 of the ring filter element 1, so that in a subsequent working step the dirt pot 5 can be connected with the end disc 3, in particular welded. Of course, a welding of the water separator 6 to the lower end disc 3 after the welding of the dirt pot 5 to the lower end disc 3 is also conceivable, wherein in this case the water separator 6 must be subsequently introduced through an opening 10 of the dirt pot 5 on the base side.

On viewing FIGS. 1 and 3 to 5, it can be seen that on the pin 7, i.e. in particular on its pin head, at least one sealing element 11 is arranged which tightly closes the channel 9 with the pin 7 engaging therein. The at least one sealing element 11 can be constructed here for example as a conventional O-ring seal. On viewing FIG. 5, it can be seen that the pin 7 has a shaft 12 which is cruciform in cross-section, and that the pin has the previously mentioned pin head adjoining thereto, wherein the cross-section profile of the shaft 12 gives the pin 7 a high degree of rigidity. For the correct introduction of the pin 7 in the channel 9, a guide 13 can be provided on the filter housing pot or on the functional element 8, with which guide in the best case the pin 7 slides along with low friction to the channel 9. The guide 13 can be constructed here for example in the manner of an incline.

The invention not only relates here to a complete filter device, consisting of filter housing and filter housing pot and functional element 8 arranged therein and ring filter element 1, but also to the ring filter element 1 as a separate component, in particular for the spare parts market. Through the construction of the ring filter element 1 in one piece together with the dirt pot 5 and in particular through the construction of the pin 7 and of the dirt pot 5 in one part, a complete part can therefore be produced, in particular also for the spare parts market, which on the one hand is favourably priced and which on the other hand guarantees that no unsuitable and non-authorized brands are used, which can weaken the filter performance and thereby, under certain circumstances, can cause damage. Of course, both the pin element 7 and also the dirt pot 5 can be constructed here from favourably priced plastic, in particular as a plastic injection moulded part. In the illustrations, the channel 9 is constructed as an idle channel.

The invention claimed is:

1. A filter element, the filter element having a central axis, the filter element comprising:
   an upper end disc;
   a lower end disc;
   a filter material arranged between the upper end disc and the lower end disc;
   a dirt pot below the lower end disc and having an internal space, the dirt pot having an outer surface;
   a pin protruding outwardly and away from the outer surface of the dirt pot, the pin configured to be received within a channel of a mating component in an installed orientation, the pin offset from and parallel with the central axis, the pin having a sealing element that is configured to tightly close with the channel in the installed orientation; and
   an opening in the dirt pot configured to be sealed against leakage in the installed orientation, the opening centrally aligned with the central axis.

2. The filter element of claim 1, further comprising a water separator positioned within the internal space, wherein the water separator is a coalescer that collects and diverts water from one of a fuel and oil that passes through the filter material.

3. The filter element of claim 2, wherein the water separator is connected to the lower disc.

4. The filter element of claim 1, wherein the pin is attached to the outer surface at an attachment point, the pin protruding away from the dirt pot along an axis, the pin having a first width at the attachment point that is approximately orthogonal to the axis, the pin having a free end, and a groove defined between the attachment point and the free end for the sealing element and having a second width that defines a circumference of the groove, the second width approximately orthogonal to the axis.

5. The filter element of claim 4, wherein the first width is greater than the second width.

6. The filter element of claim 5, wherein the sealing element has an outer diameter, the first width being greater than the outer diameter.

7. The filter element of claim 5, wherein the pin includes an inner shoulder and an outer shoulder that axially contain the sealing element within the groove, and the inner shoulder is located at an axial location along the axis that is between the sealing element and the attachment point.

8. The filter element of claim 7, wherein a width of the pin includes a portion that varies in a continuous and non-narrowing fashion from the inner shoulder to the attachment point.

9. The filter element of claim 8, wherein the width of the pin along the portion increases between the inner shoulder and the attachment point.

10. The filter element of claim 5, wherein the pin defines a third width between the groove and the free end, the third width being greater than the second width, and wherein the free end is approximately orthogonal to the axis.

11. The filter element of claim 5, wherein the pin includes a shaft that is a cruciform cross-section.

12. The filter element of claim 5, wherein the pin is positioned at an offset radial location from a central axis of the filter element, such that the free end of the pin engages with a guide of a functional element prior to positioning the pin within the channel in the installed orientation.

13. The filter element of claim 12, further comprising the functional element having the channel configured to receive the pin, a portion of the functional element being configured to penetrate the opening of the dirt pot such that the ring filter element is sealed at the opening, the portion of the functional element further having at least one water discharge opening, wherein the filter device is operational when the pin engages into the channel.

14. A method of fabricating a filter element having a central axis, comprising:
providing an upper end disc;
providing a lower end disc;
arranging a filter material between the upper end disc and the lower end disc;
providing a dirt pot below the lower end disc and having an internal space, the dirt pot having an outer surface;
attaching a pin to the dirt pot that protrudes outwardly and away from the outer surface of the dirt pot, the pin configured to be received within a channel of a mating component in an installed orientation, the pin offset from and parallel with the central axis, the pin having a sealing element that is configured to tightly close with the channel in the installed orientation; and
configuring an opening in the dirt pot to be sealed against leakage when the filter element is in the installed orientation, the opening centrally aligned with the central axis.

15. The method of claim 14, further comprising positioning a water separator within the internal space, wherein the water separator is a coalescer that collects and diverts water from one of a fuel and oil that passes through the filter material.

16. The method of claim 15, further comprising connecting the water separator to the lower disc.

17. The method of claim 14, further comprising:
attaching the pin to the dirt pot at an attachment point;
configuring the pin to be received within the channel in the installed orientation, the pin protruding away from the outer surface along an axis, the pin having a base of a first width at the attachment point that is approximately orthogonal to the axis, the pin having a free end, and a groove defined between the attachment point and the free end for the sealing element and having a second width that defines a circumference of the groove, the second width approximately orthogonal to the axis.

18. The method of claim 17, wherein configuring the pin further comprises configuring the pin having the first width greater than the second width.

19. The method of claim 18, wherein attaching the sealing element further comprises attaching the sealing element having an outer diameter, the first width being greater than the outer diameter.

20. The method of claim 18, wherein configuring the pin further comprises configuring the pin having an inner shoulder and an outer shoulder that axially contain the sealing element within the groove; and
locating the inner shoulder at an axial location along the axis that is between the sealing element and the attachment point.

21. The method of claim 20, wherein configuring the pin further comprises configuring the pin having a width that includes a portion that varies in a continuous and non-narrowing fashion from the inner shoulder to the attachment point.

22. The method of claim 21, wherein configuring the pin further comprises configuring the pin having the width of the pin along the portion that increases between the inner shoulder and the attachment point.

23. The method of claim 18, wherein configuring the pin further comprises configuring the pin to define a third width between the groove and the free end, the third width being greater than the second width, and wherein the free end is approximately orthogonal to the axis.

24. The method of claim 18, wherein configuring the pin further comprises configuring the pin to include a shaft that is a cruciform cross-section.

25. The method of claim 18, further comprising positioning the pin at an offset radial location from a central axis of the filter element, such that the free end of the pin engages with a guide of a functional element prior to positioning the pin within the channel in the installed orientation.

26. The method of claim 25, further comprising configuring the functional element with the channel that is configured to receive the pin, a portion of the functional element being configured to penetrate the opening of the dirt pot such that the ring filter element is sealed at the opening, the portion of the functional element further having at least one water discharge opening, wherein the filter device is operational when the pin engages into the channel.

\* \* \* \* \*